Figure 1:
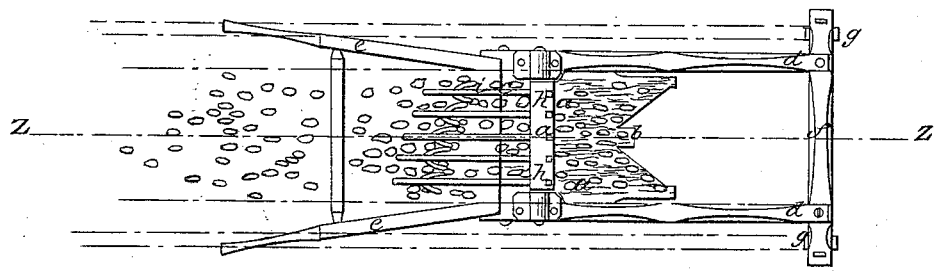

E. S. LENOX.

Potato-Digger.

No. 51,731.                           Patented Dec. 26. 1865.

Witnesses:
W. B. Gleason
M. W. Frothingham

Inventor:
E. S. Lenox
By his atty
J. B. Crosby

UNITED STATES PATENT OFFICE.

E. S. LENOX, OF NEW YORK, N. Y.

IMPROVEMENT IN POTATO-DIGGERS.

Specification forming part of Letters Patent No. 51,731, dated December 26, 1865.

*To all whom it may concern:*

Be it known that I, E. S. LENOX, of the city, county, and State of New York, have invented an Improved Potato-Digger; and I do hereby declare that the following, taken in connection with the drawings which accompany and form part of this specification, is a description of my invention sufficient to enable those skilled in the art to practice it.

This invention relates to that class of potato-diggers which are designed to leave by their operation the potatoes on the surface of the soil, the gathering being performed by hand after the digging has been accomplished.

So far as I know, all potato-diggers operating to leave the potatoes on the surface of the soil have divided the drill or row, in which potatoes are planted, with a plowshare or other device so constructed as to turn the soil each way from the center outwardly, which method has this radical defect, viz: The potatoes fall into the furrows or depressions between the rows or drills, and are many of them buried up under the soil which rolls over upon them, or are crushed by the next passage of the team.

A general description of a potato-digger so constructed as to embody my invention is as follows: Two mold-boards or plowshares are united, so that in action they turn the soil from each side inwardly toward their juncture or the center line between them. At the front of the mold-boards, where they join, is a strong point projecting forward, and also below the plane formed by the general lower surface or sole of the implement, the use of the point being to steady the action of the digger, and to form a kind of fulcrum on which the operator can swerve the implement to the right or left. The rear ends of the mold-boards terminate horizontally at an elevation of from about five to eight inches above the sole. The operation of the mold-boards is to make a cut in the center of each row of from ten to fourteen inches wide and from five to eight inches deep, according to the size given to the implement and its adjustment, and to turn the soil and its contents with a twisting motion from both sides of the cut inward toward the center, raising the whole till it falls from the rear of the mold-boards by the general movement of the digger.

The soil which is partially pulverized by the entrance of the mold-boards is further disintegrated by the twist or turning which the mold-boards give it, and still further by the fall from the mold-boards, the result of which is that the potatoes, stones, and clods, will be left mostly on the surface of the row and in the track of the digger. To still further bring the potatoes to the surface, I make use of stirrers, which, while they may be variously constructed and applied, are all equivalent so long as they operate on the same general principle—viz., by acting beneath the soil in the track of the mold-boards to tend to carry the loosened mass forward in said track, and thereby causing the potatoes and other lumps and masses with which they come into contact to take the line of least resistance, which is upward to the surface of the soil.

Having thus generally described the embodiment of my invention, I would now state that it consists in such an arrangement of two mold-boards as will, when drawn forward under the soil, cleave it on opposite sides, turn it inward toward the center, raise it on the mold-boards, and discharge it over the rear end thereof in the track of the machine; also, in the employment of stirrers acting under the soil, after suitable plowshares, to move the soil and contents forward, by which the potatoes are caused to appear on the surface; also, in the combination of the center point with two mold-boards arranged to turn the soil inward toward a common center from each side; also, in combination with such mold-board, acting as described, of two guide-wheels arranged to act on both sides of the drill to gage the depth of operation of the mold-boards, and to act to guide and steady the operation of the implement.

Figure 2:
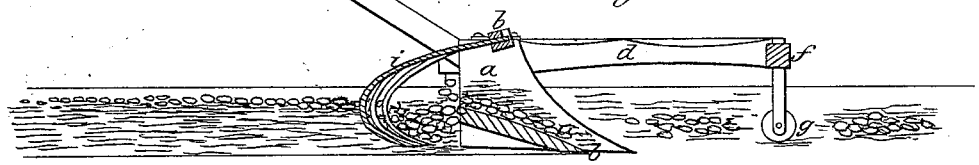
Figure 3:
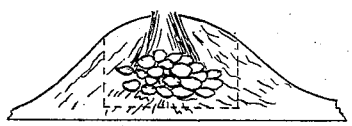
Figure 4:
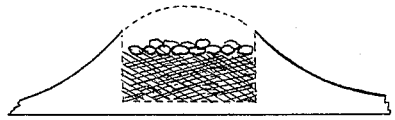

Figure 1 of the drawings represents my digger in plan and in operation. Fig. 2 represents it in the same condition, but in sectional elevation. Fig. 3 is a cross-section of a drill or row of potatoes with lines showing the cut which the digger will make. Fig. 4 represents in cross-section the same drill or row as it will appear after the operation of the implement.

The mold-boards are represented by *a a*, having their operative curved faces joined on the central line *z z*. The guiding and steadying point is marked $b$, and the horizontal line of the mold-boards at their rear, over which the soil falls in the track of the implement, is marked $c\ c$.

Affixed to the upper part of the plowshares $a\ a$ are the means for traction and guidance, consisting of the beams $d\ d$ and handles $e\ e$. The cross-piece $f$, which joins and braces the beams, and to which the team is hitched, is provided at each end with rolls or wheels $g\ g$, intended to roll on the surface of the ground in the valleys or depressions alongside of the drills or rows. These wheels or rolls are arranged to be adjusted vertically with respect to the sole of the mold-boards, so as to conform to various heights of drills or rows, and so as to govern the depth of cut of the mold-boards.

Figure 5:
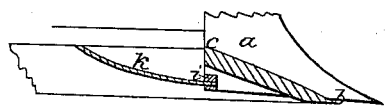

The stirrers represented are in the form of a series of hooks secured to a cross-shaft, $h$, which is mounted in boxes, so that the hooks $i$ may be turned up out of the way when turning the implement or when dragging over the surface of the ground. The tendency of these hooks, constructed as shown in the drawings, is to rise up out of the ground, and in practice I weight them, so as to keep the points of them down upon and so as to drag on the hard surface left by the sole of the digger. The hooks are shown as arranged on a single incline from side to side, this being to facilitate the removal or clearance of clods, &c. It might perhaps be preferable to arrange them for the same purpose on a double incline from the center to each side. One of some of the other forms of stirrers which may be used in lieu of the hook form described is shown in Fig. 5, where a cross-bar, $j$, is shown secured to the mold-boards near the rear end of the sole, which bar is provided with a series of stirrers like those marked $k$.

It is evident that the stirrers $k$ tend to carry the potatoes forward in the track of the mold-boards; but their resistance to forward motion being greater than the resistance to upward movement, they rise up through the soil and appear on its surface. Where the stirrers are used in the form of hooks or of straight or inclined bars or rods passing from a support above down into the soil it will be well to introduce a coil or two into each stirrer-bar to enable it to yield to obstructions, like the tooth of a horse-rake.

The cattle employed to draw the digger travel in the depressions on each side of the drill being operated upon, and the farmer while holding and guiding naturally braces himself by walking with one foot in one valley and the other in the other valley, on each side of the row, so that the potatoes are not crushed or injured by trampling.

If it is deemed desirable, a small cultivator-share can be placed on each beam in advance of the mold-boards, so that the small triangular section on either side, and not containing the potatoes, can be turned outward into the valleys; or the mold-boards, instead of being made parallel with the center of the implement, might be flared outward toward the rear and effect the same result; but where there is grass on the drill I prefer the small shares in advance of the mold-boards.

Previous to using the digger the potato-tops should be pulled or mowed and raked off from the rows.

I claim—

1. An arrangement of mold boards, substantially as described.

2. In combination with two mold-boards, arranged as specified, the stirrers which bring the potatoes to the surface of the ground.

3. The combination of the center point with two mold-boards arranged to turn the soil inward, substantially as set forth.

4. In combination with such mold-boards, operating as described, the guide-wheels which gage the depth of operation of the mold-boards and guide and steady the implement in its progressive movement.

In witness whereof I have hereunto set my hand this 5th day of October, A. D. 1865.

EDWIN S. LENOX.

Witnesses:
J. B. CROSBY,
W. B. GLEASON.